Patented Nov. 28, 1933

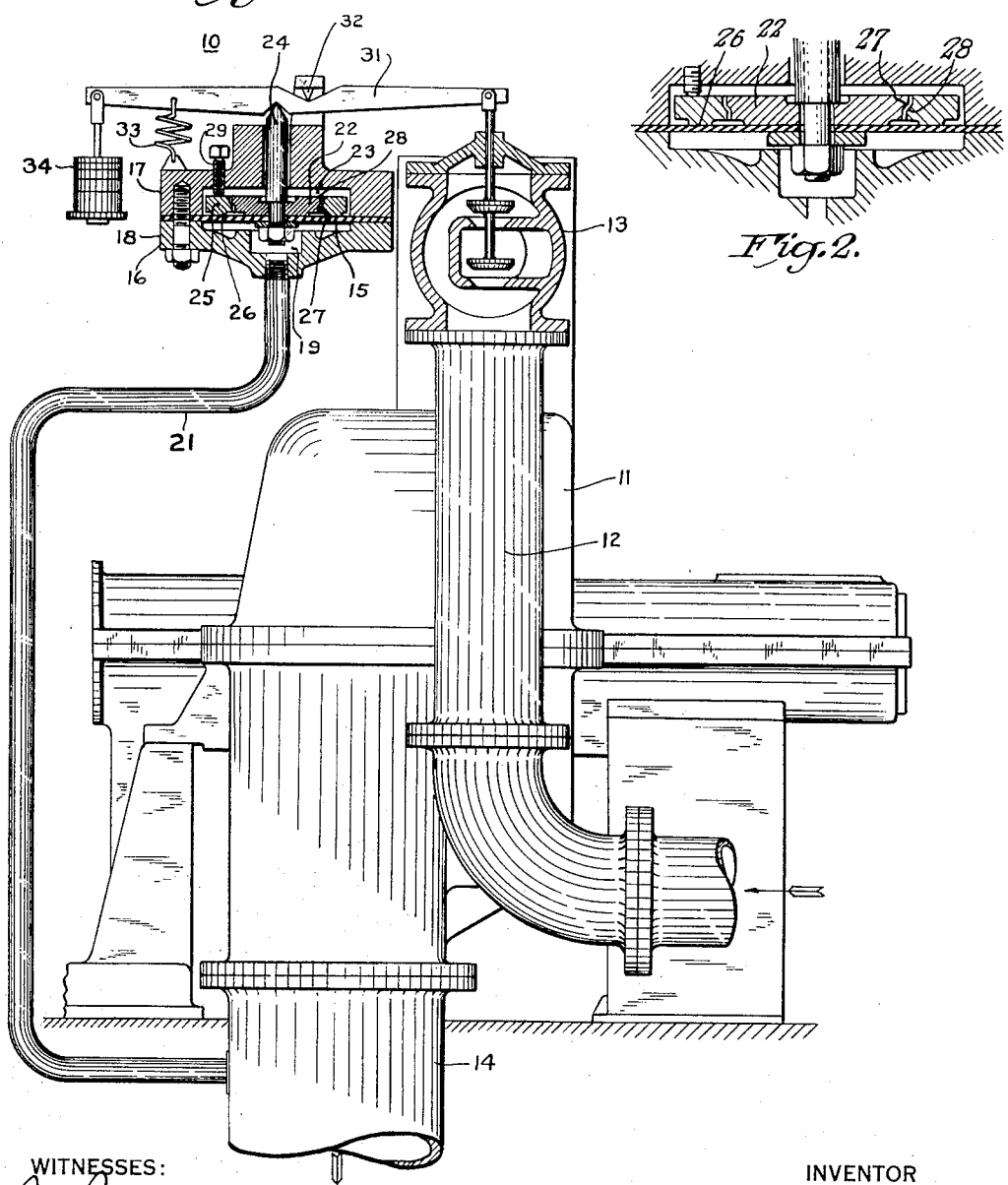

1,937,314

UNITED STATES PATENT OFFICE 1,937,314

FLUID PRESSURE RESPONSIVE DIAPHRAGM

Ozro N. Bryant, Moores, Pa., assignor to Westinghouse Electric & Manufacturing Company, a corporation of Pennsylvania Application February 25, 1930. Serial No. 431,226

4 Claims. (Cl. 137—157)

My invention relates to a fluid pressure-responsive diaphragm, and it has for its object to provide a diaphragm adapted for operation at either one of two or more different pressures.

A more specific object is to provide a fluid pressure-responsive diaphragm which is equally sensitive at all pressures at which it is adapted to operate.

In accordance with my invention, I provide a member which is adapted, in one position, to engage the diaphragm and hold a part thereof against movement in response to the fluid pressure acting thereon. As the area of the diaphragm on which the fluid pressure is effective to move the diaphragm is decreased, a higher pressure is required to move the diaphragm to a given position than is required when a greater portion of the diaphragm is movable.

The above and other objects are effected by my invention, as will be apparent from the following description and claims taken in connection with the accompanying drawing, forming a part of this application, in which:

Fig. 1 is a view, partly in section and partly in elevation, of a regulating mechanism embodying my novel diaphragm and applied to a back pressure turbine.

Fig. 2 is an enlarged sectional view of the diaphragm.

Referring now to the drawing more in detail, I show my novel fluid pressure-responsive diaphragm embodied in a regulating mechanism 10 for a back pressure steam turbine 11. I desire it to be understood, however, that this application is only by way of example, and that the diaphragm may be used in any regulating or control mechanism responsive to fluid pressure.

The turbine 11 is supplied with steam from a conduit 12 through a valve 13, which controls the admission of steam to the turbine. The turbine exhausts partially expanded steam into a conduit 14, through which requirements for low pressure steam are supplied. The flow of steam through the turbine is controlled by the regulating mechanism 10 to meet these requirements and to maintain the pressure substantially constant.

The regulating mechanism 10 includes a diaphragm 15, which may be made of any suitable flexible sheet material, such as rubber. The diaphragm is secured in a stationary structure 16, preferably by clamping the outer marginal portion thereof between the parts 17 and 18 of the stationary structure. The lower part 18 is formed with a chamber 19 on the lower side of the diaphragm 15, and the pressure in the conduit 14 is communicated through a conduit 21 to the chamber to bias the diaphragm upwardly.

A disc member 22, disposed in a recess 23 in the upper part 17, contacts with the central portion of the diaphragm on the upper side thereof and is secured thereto by a stem 24, which extends upwardly through the part 17. An annular ring 25 is also disposed in the recess 23 and bears against the diaphragm 15, as indicated at 26, along an annular area between the secured marginal portion and the central portion bearing against the disc 22. The ring 25 is provided with a shoulder 27 adapted to abut a shoulder 28 formed on the disc 22, upon sufficient upward movement of the ring 25.

Suitable means is provided for holding the annular ring 25 in a lowered position and against movement by the diaphragm 15. This means preferably consists of three equally spaced screws 29 extending through the upper part 17 and adapted to abut against the annular ring. These screws are adapted to be raised sufficiently to entirely disengage the ring 25, permitting the fluid pressure acting on the surface 26 of the diaphragm to move the ring 25 upwardly until the shoulders 27 and 28 engage, thereby transmitting the force of the fluid pressure on the surface 26 to the disc 22.

The stem 24 engages a lever 31 which is fulcrumed on a knife-edge 32. The lever is biased in counter-clockwise direction by a spring 33, disposed between the left-hand arm of the lever and the stationary structure 16. The lever 31 is further biased in the same direction by a number of weights, indicated at 34, suspended from the left-hand arm of the lever. The right-hand arm of the lever 31 controls the admission valve 13 in any suitable manner known in the art. For simplicity, it is shown as directly connected thereto.

The operation of the above-described apparatus is as follows:

Assume that at certain times it is desired to maintain a pressure of substantially 20 lbs. per sq. in. in the conduit 14, and that at other times it is desired to maintain a pressure of substantially 60 lbs. per sq. in. When it is desired to maintain the lower pressure, the screws 29 are raised to disengage the annular ring 25. The fluid pressure in the chamber 19 acts against the surface of the diaphragm to move the ring 25 into engagement with the disc 22. The pressure in the chamber 19 is now effective on substantially the entire surface of the diaphragm inside of the secured marginal portion.

Upon an increase in pressure in the conduit 14, which may be caused by a decrease in demand for fluid from said conduit, the diaphragm 15 moves the lever 31 in clockwise direction against the force of the spring 33. The spring 33 is deflected an amount proportional to the increase in pressure, and determines a definite closing movement of the valve 13. The latter restricts the flow of fluid through the turbine to the conduit 14 to restrict the increase in pressure therein.

Upon a decrease in pressure in the conduit 14, the spring 33 moves the lever 31 in counter-clockwise direction, the deflection thereof again being decreased by an amount proportional to the decrease in pressure. The movement of the lever 31 opens the valve 13 further to restrict the decrease in pressure in the conduit 14.

It will be apparent that a change in deflection of the spring 33 is necessary to effect movement of the valve 13, and that a change in pressure in the conduit 14 is necessary to effect the change in deflection of the spring. There must be a variation of the pressure in the conduit 14 through a given range to effect movement of the valve 13 between the limits of its travel. The above-described apparatus may be designed, for example, to effect the operation just described between the limits of 19.2 lbs. and 20.8 lbs., a range of 8% of the desired pressure.

Assume now that it is desired to effect a setting of the regulating mechanism which will maintain a pressure of approximately 60 lbs. per sq. in. in the conduit 14. The screws 29 are lowered to engage the annular ring 25 to maintain the same in position low enough to disengage the disc 22 at the lower end of its travel. The fluid pressure in the chamber 19 acting on the surface 26 is ineffective, therefore, to bias the disc 22. A higher pressure on the reduced effective area of the diaphragm is required, therefore, in the chamber 19 to move the valve 13 between the limits of its travel. The diaphragm now acts in the same manner above described to control the valve 13 in response to the pressure in the conduit 14, but it now operates to maintain a higher pressure therein.

It will be apparent that the pressures effecting operation of the regulating mechanism at the higher setting will be proportional to the pressures at the lower setting. For example, if the mechanism operates in response to variation between 19.2 and 20.8 lbs. per square inch at the lower setting, it will operate in response to variation between 57.6 and 62.4 lbs. per square inch at the higher setting. The range of 4.8 lbs. per sq. inch is 8% of the desired pressure of 60 lbs. per square inch, the same percentage of variation as at the lower setting.

While I have shown my invention in but one form, and have shown only one ring 17, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a pressure-responsive regulating mechanism, the combination of a diaphragm of flexible sheet material, means for applying fluid pressure to one side of said diaphragm, a disc member attached to the opposite side of the diaphragm, a ring adapted to bear against said opposite side and circumscribing said disc member, said ring being adapted to engage the disc member in the direction away from the diaphragm, and means for selectively holding said ring against movement away from the diaphragm, whereby, when said ring is free to move, the fluid pressure is effective on the areas of both the disc member and the ring, and, when the ring is held against movement, the fluid pressure is effective against the area of the disc member only.

2. The combination with a fluid pressure-responsive diaphragm, of means for adapting the same for operation at either one of two or more different pressures comprising a member adapted to engage the diaphragm and hold a portion of the area thereof against movement, and means for selectively holding said member against movement or permitting the same to move with the diaphragm when the latter moves in response to fluid pressure.

3. The combination with a fluid pressure-responsive diaphragm having a member movable with the diaphragm, of means for adapting the diaphragm for operation at either one of two or more different pressures comprising an annular ring adapted to contact with the outer marginal portion of the movable part of the diaphragm, means for selectively holding said ring against movement by the diaphragm or permitting the same to move with the diaphragm, said member and said ring being adapted to abut when the ring is permitted to move with the diaphragm.

4. The combination with a fluid pressure-responsive diaphragm having a member movable therewith, of means for adapting the same for operation at either one of two different pressures comprising a second member engaging a movable portion of the diaphragm, and means whereby the second member may be either held against movement to reduce the movable area of the diaphragm or engaged with the first-mentioned member to provide increased movable area of the diaphragm.

OZRO N. BRYANT.